United States Patent [19]

Ohashi

[11] Patent Number: 5,339,631
[45] Date of Patent: Aug. 23, 1994

[54] AXLE DRIVING SYSTEM

[75] Inventor: Ryota Ohashi, Kobe, Japan

[73] Assignee: Kanzaki Kokyukoki Mfg. Co. Ltd., Amagasaki, Japan

[21] Appl. No.: 22,389

[22] Filed: Feb. 24, 1993

Related U.S. Application Data

[63] Continuation of Ser. No. 747,706, Aug. 20, 1991, abandoned.

[30] Foreign Application Priority Data

Aug. 20, 1990 [JP] Japan .................. 2-87257[U]
May 2, 1991 [JP] Japan .................. 3-30833[U]

[51] Int. Cl.$^5$ ........................... F16D 39/00
[52] U.S. Cl. ........................... 60/487; 91/499; 60/488; 60/490
[58] Field of Search .......... 60/487, 488, 489, 490; 91/499, 506, 505

[56] References Cited

U.S. PATENT DOCUMENTS

| | | | |
|---|---|---|---|
| 2,480,069 | 8/1949 | Wright | 91/499 |
| 4,616,478 | 10/1986 | Jensen | 60/489 X |
| 4,891,943 | 1/1990 | Okada | 60/464 |
| 4,899,541 | 2/1990 | Okada et al. | 60/487 X |
| 4,903,545 | 2/1990 | Louis et al. | 74/606 R |
| 4,905,472 | 3/1990 | Okada | 60/487 X |
| 4,914,907 | 4/1990 | Okada | 60/487 |
| 4,932,209 | 6/1920 | Okada et al. | 60/487 |
| 4,953,426 | 9/1990 | Johnson | 74/606 R |
| 4,979,583 | 12/1990 | Thoma et al. | 180/62 |
| 5,031,403 | 7/1991 | Okada | 60/487 X |
| 5,156,576 | 10/1992 | Johnson | 475/72 |
| 5,203,169 | 4/1993 | Ishii et al. | 60/487 |

FOREIGN PATENT DOCUMENTS

64-4520 1/1989 Japan.

*Primary Examiner*—Edward K. Look
*Assistant Examiner*—Hoang Nguyen
*Attorney, Agent, or Firm*—Sterne, Kessler, Goldstein & Fox

[57] ABSTRACT

The present invention, firstly, lowers the lower end of pump shaft to lower the belt transmitting mechanism to thereby provide the axle driving system for the integral hydraulic transmission matching with the running vehicle of lower floor system, which is concretely the L-like-shaped center section fixed within the axle casing, so that the upper surface of the horizontal portion of the L-like-shaped center section is used as the pump mounting surface 3b, the position of which is set lower than the fixedly junction surface of the axle casing. The present invention, secondly, provides the axle driving system which is capable of quickly putting the hydraulic transmission at the axle casing in the operable state when assembled. Concretely, at the center section in the axle casing are provided the second charge ports 3s and 3t which can manually supply operating oil into the closed circuit from the exterior of the axle casing.

43 Claims, 11 Drawing Sheets

FIG 15

AXLE DRIVING SYSTEM

This application is a continuation of application Ser. No. 07/747,706, filed Aug. 20, 1991, now abandoned.

FIELD OF THE INVENTION

The present invention relates to construction of an axle driving system of an integral hydraulic transmission loaded as a transmission for a running vehicle.

BACKGROUND OF THE INVENTION

Conventionally, the axle driving system of integral hydraulic transmission has been well known as disclosed in, for example, the U.S. Pat. Nos. 4,914,907, 4,932,209 and 4,891,943. In the above-mentioned prior arts, an axle casing for supporting axles is made dividable into an upper axle casing and a lower axle casing from the position of the fixedly junction surface including a lengthwise axis of the axle, and an L-like-shaped center section is fixed in the axle casing, and the upper surface of the horizontal portion of L-like-shaped center section is served as the pump mounting surface and the outside surface of the vertical portion perpendicular to the horizontal portion of the same is served as the motor mounting surface. However, the pump mounting surface is positioned to coincide with the plane of the fixed Junction surface of the axle casing, whereby a pump shaft is positioned high and a belt transmitting mechanism for inputting an engine power is positioned high, thereby making it difficult to lower a platform of the vehicle.

At the center section are provided a closed circuit for circulating operating oil between a hydraulic pump and a hydraulic motor and charge ports for supplying to the closed circuit the operating oil filtered to be stored at the bottom of axle casing. Since such center section is contained in the axle casing, for the purpose of filling the operating oil into the closed circuit to put the hydraulic transmission in the state of being operable during the assembly, there is no way other than waiting that the hydraulic pump is driven to naturally take the operating oil into the charge port, which takes much time and is ineffective.

SUMMARY OF THE INVENTION

An object of the present invention is to provide an axle driving system for an integral hydraulic transmission which lowers the lower end of a pump shaft so as to lower a belt transmitting mechanism matching with a running vehicle specified of lower platform and to eliminate inconvenience in the conventional technique.

Also, the axle driving system of the present invention has separate means which charges the operating oil into a closed circuit and can quickly put the hydraulic transmission within the axle casing in the operable state during the assembly.

DESCRIPTION OF THE PREFERRED EMBODIMENT

Figure 1:
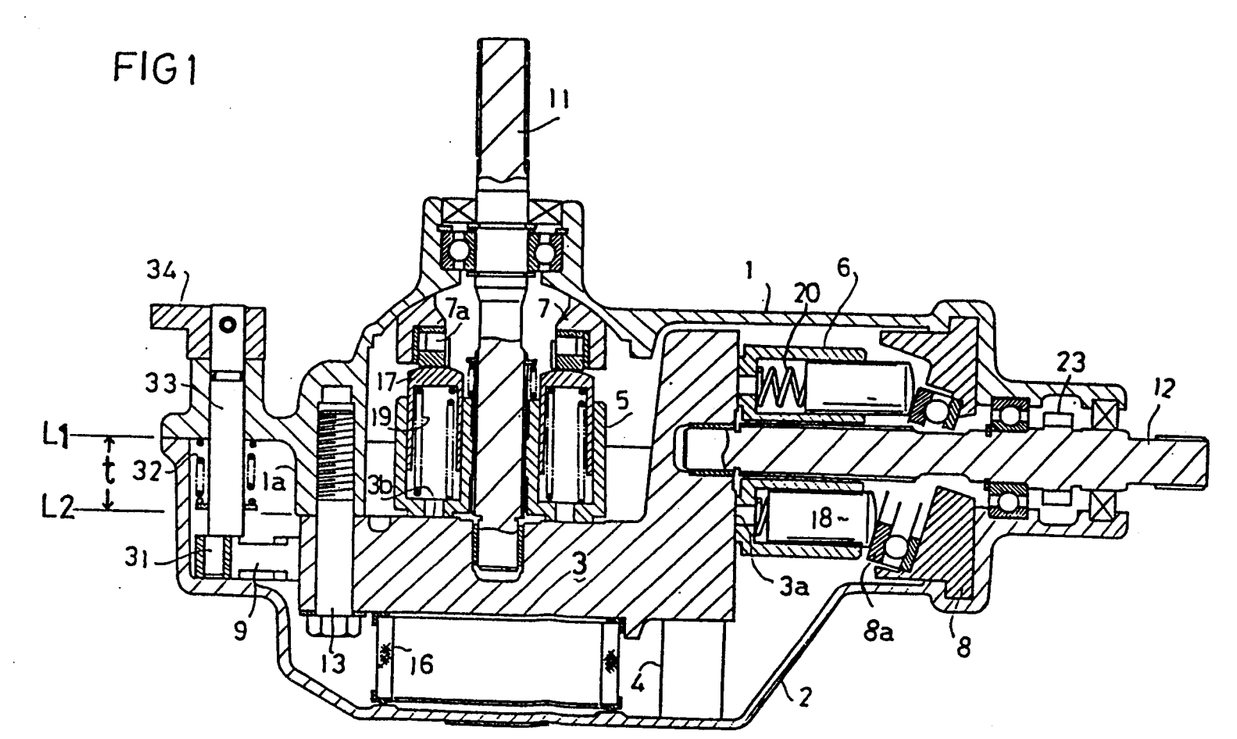
FIG. 1 is a sectional front view of an axle driving system of the present invention.
Figure 2:
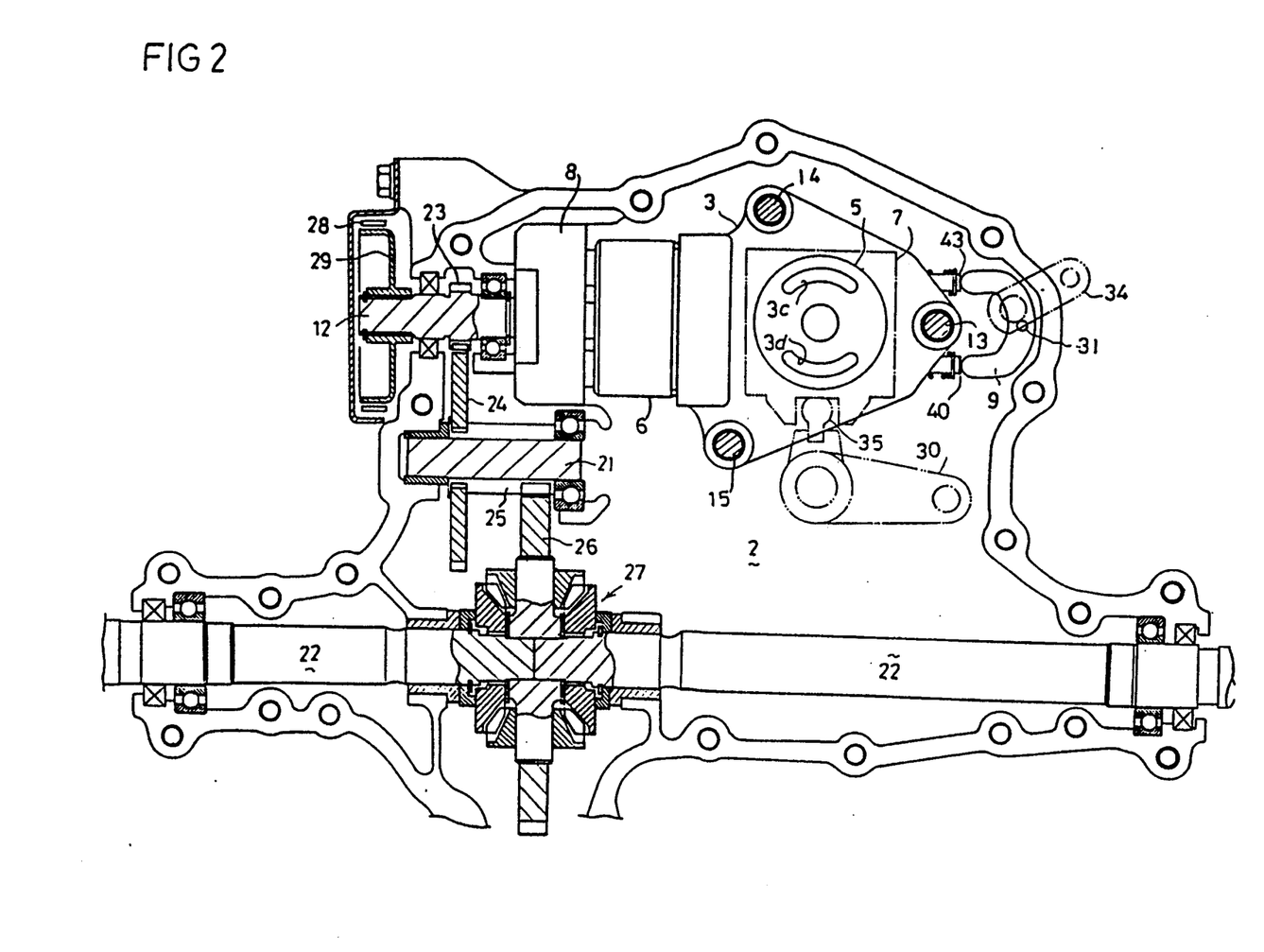
FIG. 2 is a plan view of the same, from which an upper axle casing 1 is removed.

Next, an embodiment of an axle driving system of the present invention will be described in accordance with the accompanying drawings. In FIGS. 1 and 2, an axle casing is horizontally divided into two of an upper axle casing 1 and a lower axle casing 2 at the horizontal plane containing therein the axes of left and right axles 22 and a motor shaft 12. The horizontally dividing plane serves as a fixedly junction surface L1 so that the motor shaft 12 and axles 22 are supported by bearings supported to the fixedly junction surfaces L1 between the upper axle casing 1 and the lower axle casing 2.

A pump shaft 11 is vertically supported by a bearing provided at the upper axle casing 1 and by bearing metal in a bearing bore vertically bored at an L-like-shaped center section 3, and a pulley is attached to a portion of pump shaft 11 upwardly projecting from the upper axle casing 1, so that power is transmitted to the pump shaft 11 from an engine of vertical crank shaft through a belt transmitting mechanism.

A hydraulic pump unit is disposed at a portion of pump shaft 11 entering into the upper axle casing 1, and is composed of a pump casing 5, a pump piston 17, a piston biasing spring 19, a movable swash plate 7, and a thrust bearing 7a rotatable together with the movable swash plate 7.

The pump casing 5 slidably rotates at the lower surface thereof in contact with a pump mounting surface 3b formed at the upper surface of a horizontal portion of L-like-shaped center section 3, so that the movable swash plate 7 changes at angle to pressurize operating oil and supply it to a hydraulic motor unit through a closed circuit to be discussed below in the L-like-shaped center section 3.

The hydraulic motor unit is so constructed its motor casing 6 is rotatable in the state of contacting with a motor mounting surface 3a formed at the outside surface of a vertical portion of L-like-shaped center section 3, and comprises a motor casing 6, a motor piston 18, a piston biasing spring 20, a fixed swash plate 8, and a thrust bearing 8a therefor.

Pressure oil discharged from the hydraulic pump unit is fed into an oil chamber formed of the motor casing 6 and motor piston 18, so that the motor casing 6 slidably rotates between the thrust bearing 8a and the motor mounting surface 3a in the contacting state therewith and the motor shaft 12 is fitted into the motor casing 6 in relation of engaging therewith, whereby the motor shaft 12 rotates.

The fixed swash plate 8 is bilaterally symmetrical and put not-rotatably between the upper axle casing 1 and the lower axle casing 2, so that, when the motor shaft 12 reversely rotates with respect to the rotation direction of pump shaft 11, the fixed swash plate 8 is adapted to be fixed upside down.

The L-like-shaped center section 3 when viewed in plane, as shown in FIG. 2, is formed in a modified pentagon, in which at three positions around the pump casing 5 mounted to the pump mounting surface 3b are formed bores for the fixing bolts for fixing the lower surface of the upper axle casing 1. Into the three bores are fitted three fixing bolts 13, 14 and 15, which screw with the fixedly junction surface L2 between the mounting seats 1a, 1b and 1c projecting from the upper axle casing 1 and the pump mounting surface 3b, thereby fixing the L-like-shaped center section 3 to the upper axle casing 1.

The mounting seats 1a, 1b and 1c form at the lower ends thereof the fixedly junction surface L2 at the pump mounting surface. However, the fixedly junction surface L1 between the upper axle casing 1 and the lower axle casing 2 is positioned above and the mounting seats 1a, 1b and 1c downwardly project from the fixedly junction surface L1, whereby the pump shaft 11 can be disposed in the lower position only by a distance t between the L1 and L2.

On the contrary, since the vertical portion of L-like-shaped center section 3 largely upwardly projects, kidney ports 3f and 3e for the hydraulic motor unit are positioned higher than the horizontal portion by a distance t, so that the motor shaft 12 can be level with the fixedly junction surface L1 between the upper axle casing 1 and the lower axle casing 2.

The L-like-shaped center section 3 is mounted from below to the mounting seats 1a, 1b and 1c at the upper axle casing 1 through the three mounting bolts 13, 14 and 15. When the lower axle casing 2 is moved close to the upper axle casing 1 and fixedly joined from below therewith, a cylindrical oil filter 16 is interposed and supported between the upper surface of the bottom of lower axle casing 2 and the lower surface of L-like-shaped center section 3.

Figure 3:
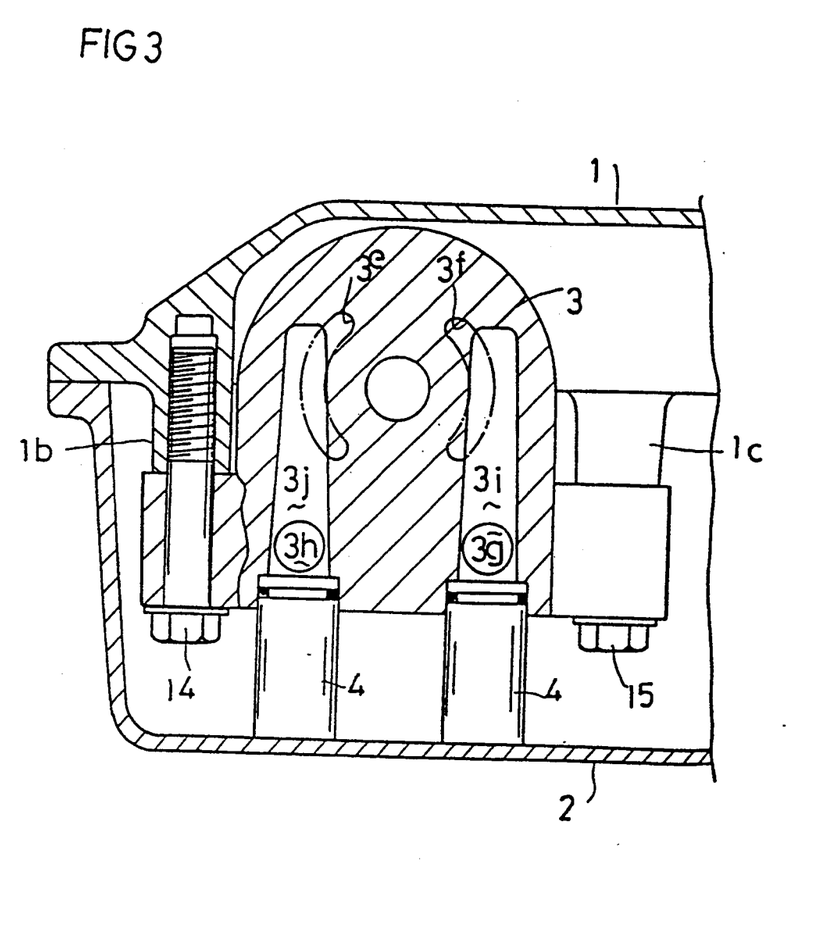
FIG. 3 is a sectional side view of a vertical portion at an L-like-shaped center section 3.

Similarly, in the embodiment shown in FIGS. 2 and 3, blind plugs 4 are fixedly interposed between the L-like-shaped center section 3 and the lower axle casing 2 in order to close lower end openings of vertical bores 3i and 3j formed at the vertical portion of L-like-shaped center section 3. Alternatively, the blind plugs 4 may be screw-threaded so as to be directly screwably fixed to the lower surface of L-like-shaped center section 3 without being interposed between the section 3 and the lower axle casing 2, thereby closing the vertical bores 3i and 3j.

As shown in FIG. 2, a speed change arm 30 is provided at a projection projecting from the upper surface of the upper axle casing 1, the arm 30 rotating to turn a speed change lever 35 so as to rotate the movable swash plate 7 for speed change.

A closed circuit opening arm 34 and a closed circuit opening shaft 33 outwardly project from the upper surface of upper axle casing 1 and an eccentric pin 31 is provided at the lower end of the closed circuit opening shaft 33.

The eccentric pin 31 biases a check valve simultaneously operating lever 9 to simultaneously push check valve biasing levers 40 and 43, so that check valves 38 and 39 are simultaneously open to open the closed circuit formed between the hydraulic pump unit and the hydraulic motor unit, thereby forming the neutral state where the hydraulic motor unit does not rotate even when hydraulic pump unit rotates, or the state where pressure oil is not kept in the closed circuit even when the pump unit rotates by being pulled from the hydraulic motor unit.

In addition, in FIG. 1, reference numeral 32 designates an energizing spring which downwardly presses the closed circuit opening shaft 33 to bias a detent mechanism formed at the lower surface of closed circuit opening arm 34 and at the upper surface of boss of the upper axle casing 1, 36 and 37 designate check valve casings, and 42 and 41 designate energizing springs for biasing the check valve biasing levers 40 and 43 in the releasing direction.

A gear 23 is engraved on an intermediate portion of motor shaft 12 so as to engage with a larger diameter gear 24 at a counter shaft 21, and a smaller diameter gear 25 at the counter gear 21 engages with a ring gear 26 at a differential gear unit 27, so that power is transmitted from the motor shaft 12 to the left and right axles 22 through the larger diameter gear 24 and smaller diameter gear 25. The differential gear unit drives the axles 22. The axles 22, counter shaft 21, motor shaft 12 are journalled between the upper and lower axle casings 1 and 2.

At the utmost end of the motor shaft 12 is provided a brake drum 29 and a braking band 28 for braking the brake drum 29.

Figure 4:
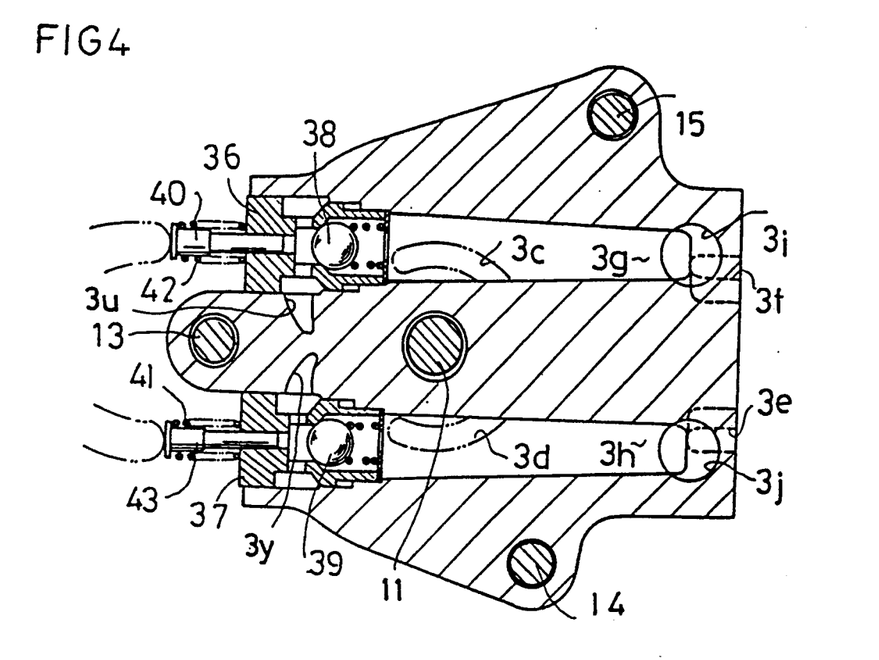
FIG. 4 is a horizontal sectional view of a horizontal portion thereof.
Figure 5:
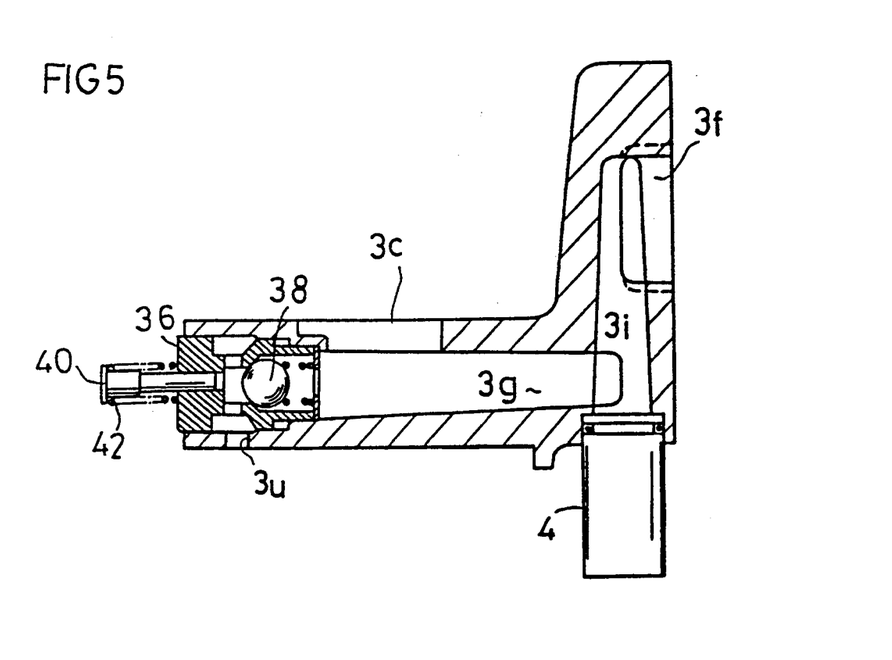
FIG. 5 is a sectional front view of part of horizontal bore 3g at the same.

FIG. 3 is a sectional side view of the vertical portion of L-like-shaped center section 3, FIG. 4 is a horizontal sectional view of the horizontal portion of L-like-shaped center section 3, and FIG. 5 is a sectional front view of part in the vicinity of a horizontal bore 3g at the L-like-shaped center section 3.

Charge ports 3u and 3y are bored which connect the check valves 36 and 37 and the lower portion of the L-like-shaped center section 3 and communicate with the interior of oil filter 16. Therefore, when operating oil decreases in the closed circuit and negative pressure is generated in an oil passage at the low pressure side, either of check valve of 38 or 39 is open so as to naturally take in the operating oil into the closed circuit from the oil filter 16 through the first charge ports 3u and 3y.

At the horizontal portion of the L-like-shaped center section 3 formed of aluminum material are formed through-bores when cast which are larger in diameter at the insertion side of check valve casings 36 and 37 and gradually smaller in diameter toward the depth, the through-bores inserting therein the check valve casings 36 and 37 and forming horizontal bores 3g and 3h constituting the closed circuit.

As shown in FIG. 5, kidney ports 3c and 3d each of oil passage in a circular arc or crescent shape are bored communicating with the upper surfaces of horizontal bores 3g and 3h, the kidney ports 3c and 3d being formed by boring an aluminum casting and communicating with a plurality of cylinder bores at the pump casing 5.

Also, as shown in FIG. 5, within the vertical portion of the L-like-shaped center section 3 are formed aluminum casting through-bores upwardly tapered and closed at the lower ends by blind plugs 4 so as to form vertical bores 3i and 3j, the horizontal bores 3g and 3h intersecting with the vertical bores 3i and 3j at the portion where the horizontal portion intersects with vertical portion of L-like-shaped center section 3. Kidney or crescent shape ports 3f and 3e of molded through-bores from aluminum casting connect with the vertical bores 3i and 3j and communicate therewith and with a plurality of communicating bores at the motor casing 6.

Figure 6:
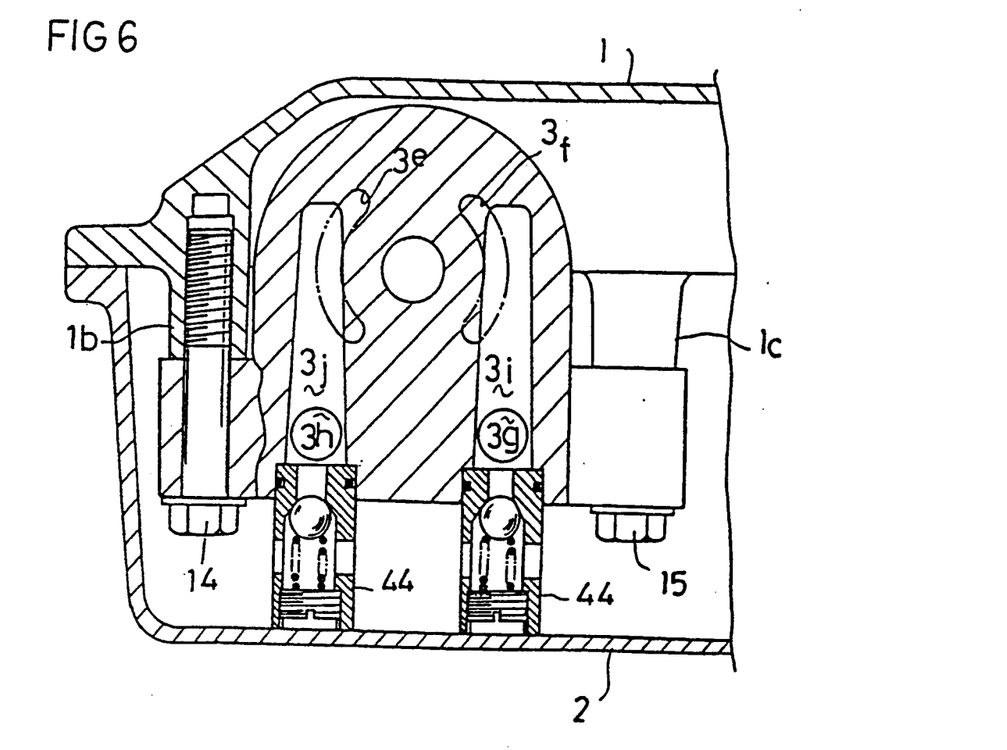
FIG. 6 is a sectional side view of an embodiment in which parts for closing horizontal bores 3i and 3j at the L-like-shaped center section 3 are closed by high pressure relief valves 44.
Figure 7:
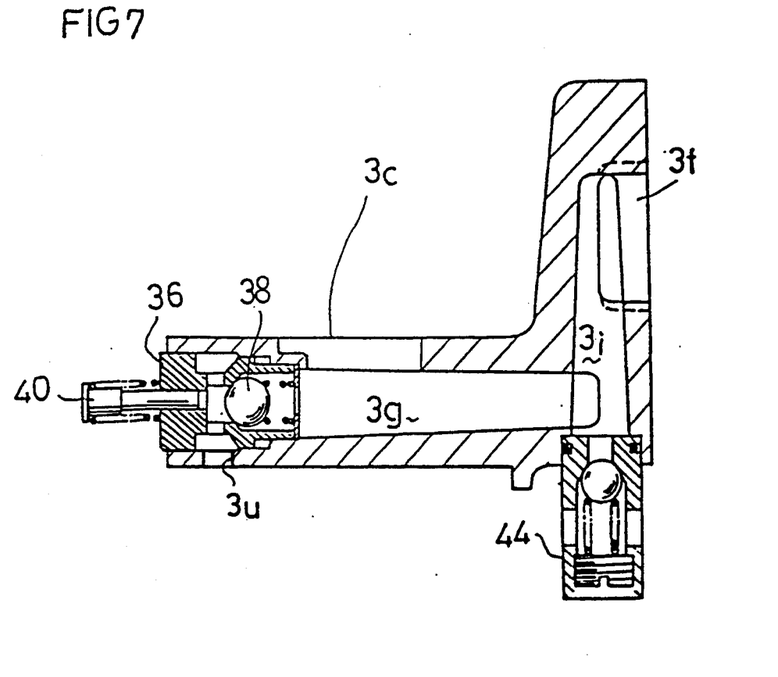
FIG. 7 is a sectional front view of the L-like-shaped center section 3.

FIG. 6 is a sectional side view of an embodiment in which portions to close vertical bores 3i and 3j at the L-like-shaped center section 3 are closed by high pressure relief valves 44 respectively, and FIG. 7 is a sectional front view of the L-like-shaped center section 3.

In the embodiment, the high pressure relief valves 44 constitute safety valve mechanisms for releasing abnormally high pressure to the tank when abnormally high pressure is generated in the closed circuit between the hydraulic pump unit and the hydraulic motor unit.

Figure 8:
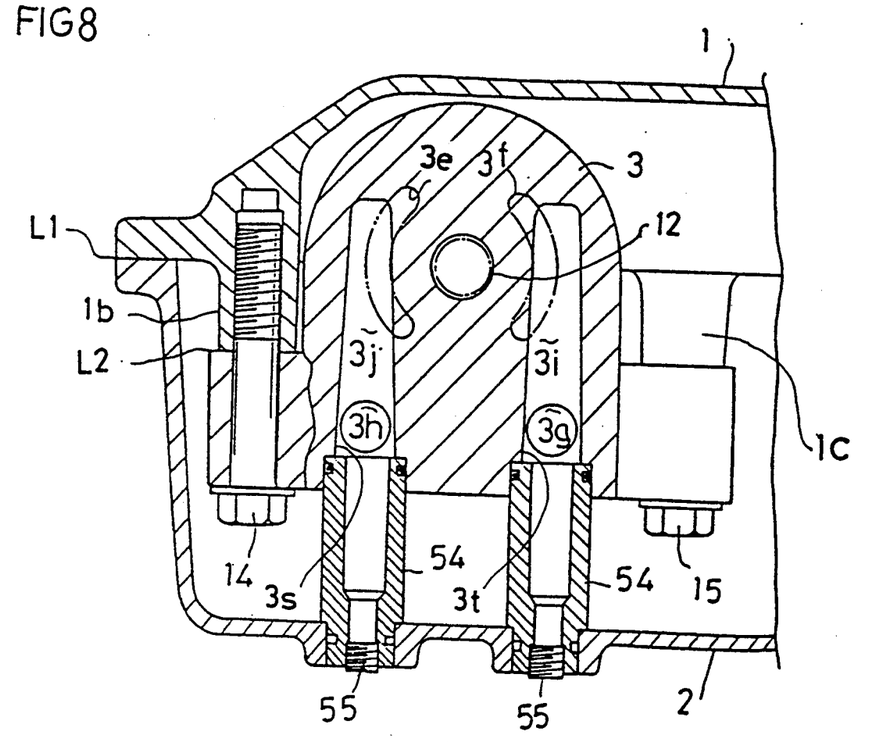
FIG. 8 is a sectional side view showing that parts for closing vertical bores 3i and 3j at the L-like-shaped center section 3 are used as charge ports during the assembly.
Figure 9:
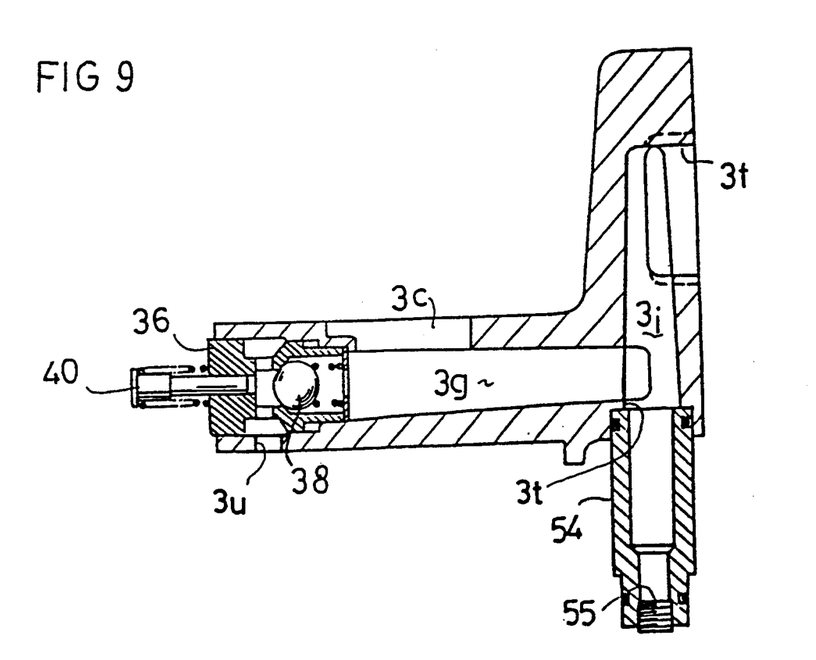
FIG. 9 is a sectional front view of the L-like-shaped center section 3.

FIG. 8 is a sectional side view of an embodiment in which closed portions for vertical bores 3i and 3j are formed in second charge ports 3s and 3t for fully charging operating oil within a closed circuit when assembled. Hollow pipe members 54 are inserted into the charge ports 3s and 3t. FIG. 9 is a sectional front view of the L-like-shaped center section 3.

The hollow pipe members 54 are exposed at the lower ends thereof outwardly from the lower surface of the lower axle casing 2 and screw-threaded blind plugs 55 are screwed with the lower ends of pipe members 54.

During the assembly, it is required to completely exhaust air from the closed circuit and to spread the operating oil to all parts therein, whereby the hollow pipe members 54 are fitted into the charge ports 3s and 3t and the screw-threaded blind plugs 55 are open to forcibly charge the operating oil therefrom into the closed circuit. Hence, the hydraulic transmission in the axle casing can be put in the state where the transmission is quickly operable.

Figure 10:
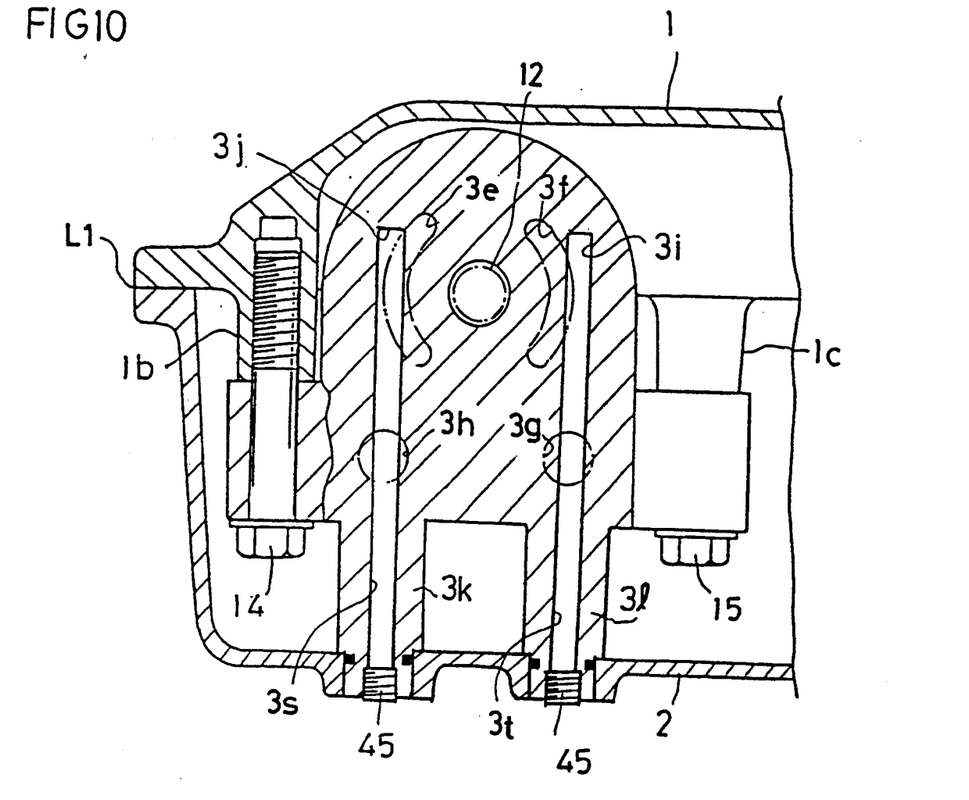
FIG. 10 is a sectional side view showing that parts of hollow members 3k and 3l communicating with charge ports 3s and 3t integrally project from the L-like-shaped center section 3 respectively.
Figure 11:
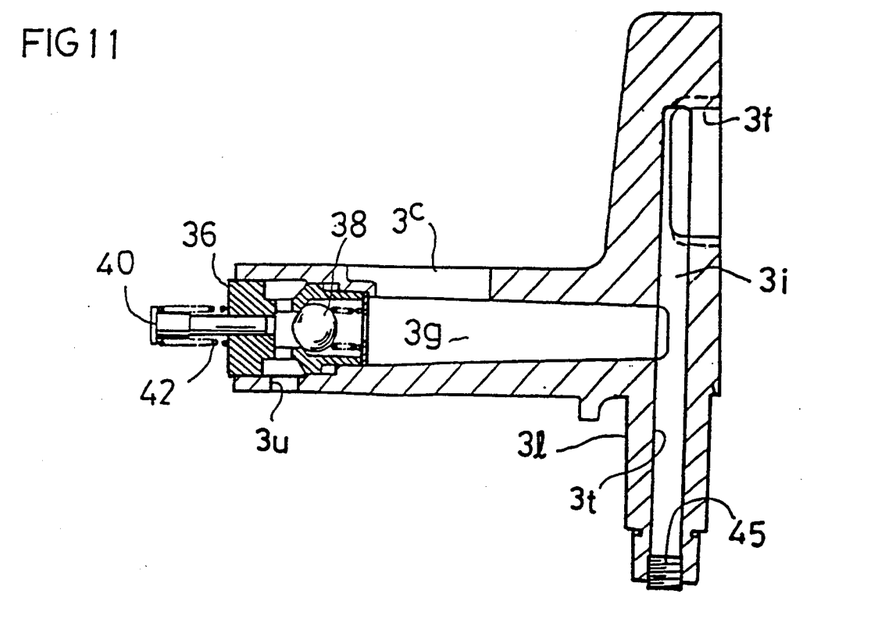
FIG. 11 is a sectional front view of the same.

FIG. 10 is a sectional side view of an embodiment in which hollow members 3k and 3l integrally project from the L-like-shaped center section 3, and FIG. 11 is a sectional front view thereof. In this case, the hollow members 3k and 3l are molded of aluminum casting integrally with the L-like-shaped center section 3 and exposed at the lower ends from the lower surface of lower axle casing 2 through the bores open thereon, the blind plugs 45 screwing with the open portions.

Figure 12:
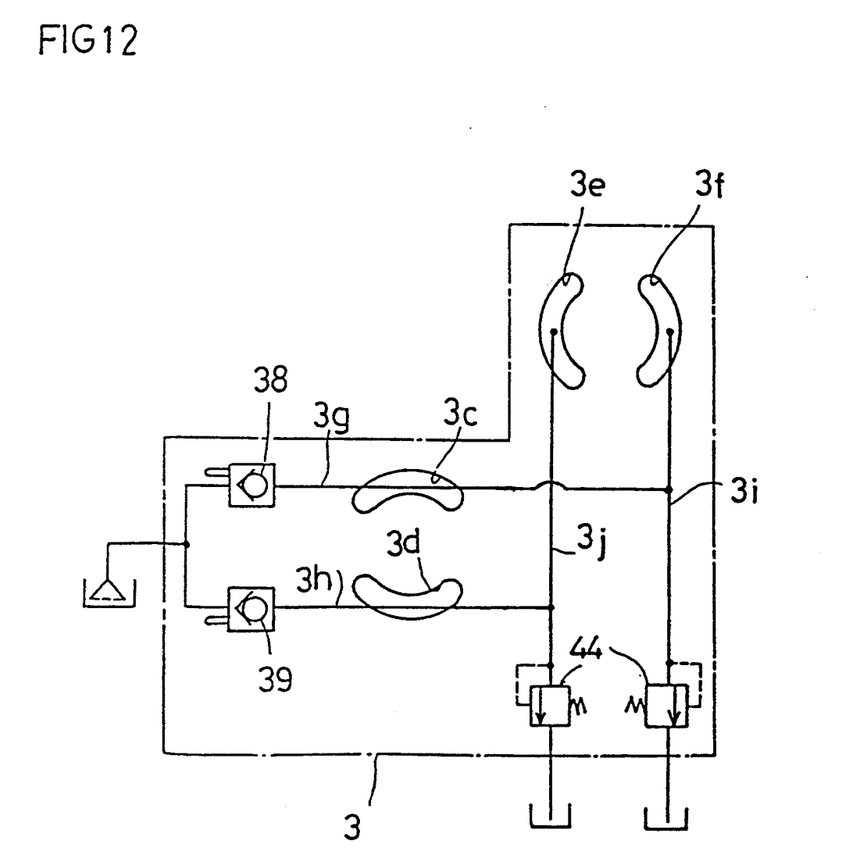
FIG. 12 is a circuit diagram of a hydraulic circuit of the axle driving system of the present invention.

FIG. 12 is a circuit diagram of the embodiment in FIGS. 6 and 7, and discloses a hydraulic circuit in which the high pressure relief valves 44 are provided in the closed position for the lower ends of vertical bores 3i and 3j.

In a case that the hydraulic motor unit is attached to the motor mounting surface 3a of L-like-shaped center section 3 and the motor casing 6 at the hydraulic motor unit rotates on the surface 3a, oil pressure generated in the kidney port 3e or 3f at the high pressure side of L-like-shaped center section 3 acts as bending stress on the vertical portion forming the motor mounting surface 3a. The bending stress, especially when the pump mounting surface 3b is set to be positioned lower than the axis of motor shaft 12 and the axis of motor shaft 12 is apart from that L2 of pump mounting surface 3b as the present invention, deflects the vertical portion in accordance with material of L-like-shaped center section 3, thereby remarkably creating inconvenience such that the operating oil may often leak from between the motor casing 6 and the motor mounting surface 3a.

Figure 13:
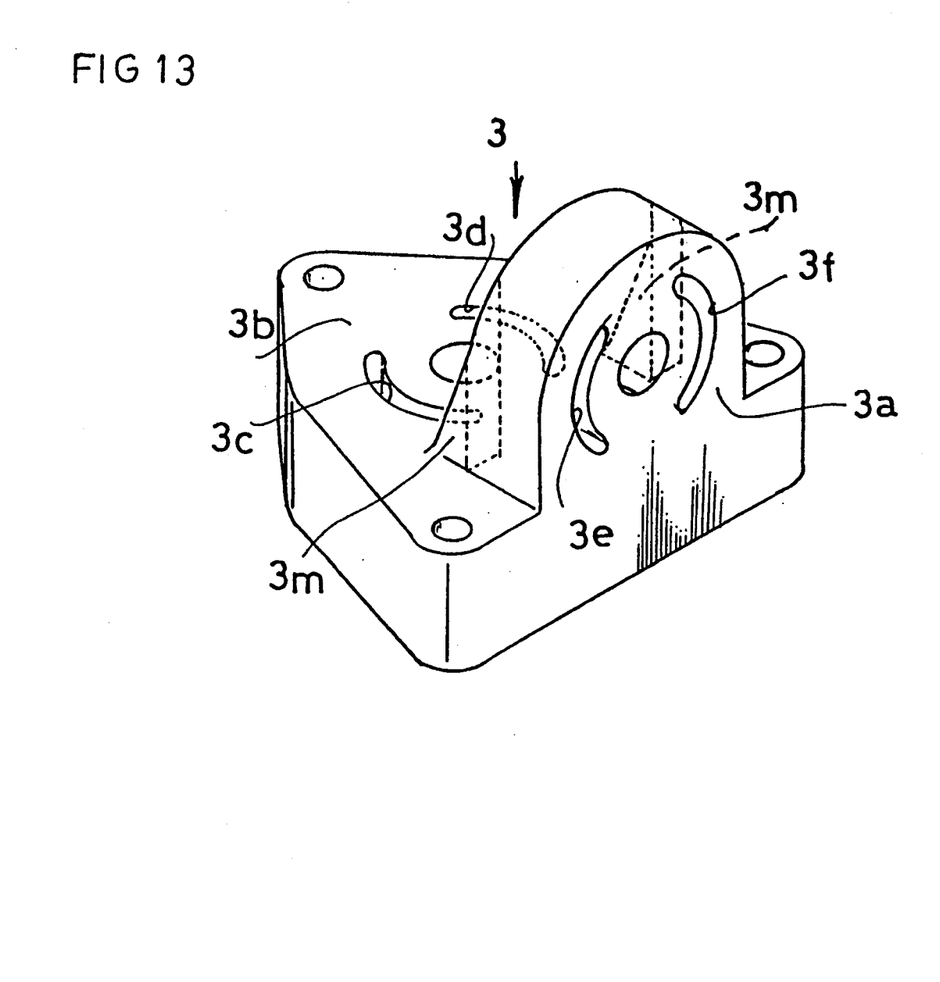
FIG. 13 is a perspective view of the L-like-shaped center section 3 in which reinforcing ribs 3m are integrally formed at both widthwise sides of the rear surface of the vertical portion at the L-like-shaped center section 3 in the relation that the ribs contact with the rear surface of the vertical portion and the horizontal portion.

In order to remove the inconvenience that the vertical portion causes deflection, the L-like-shaped center section 3 is reinforced as follows: FIG. 13 shows that reinforcing ribs 3m are integrally formed between the rear surface of the vertical portion and the upper surface of the horizontal portion of L-like-shaped center section 3 and at both widthwise sides of the vertical portion, the reinforcing ribs 3m preventing the vertical portion of L-like-shaped center section 3 from deflecting.

Figure 14:
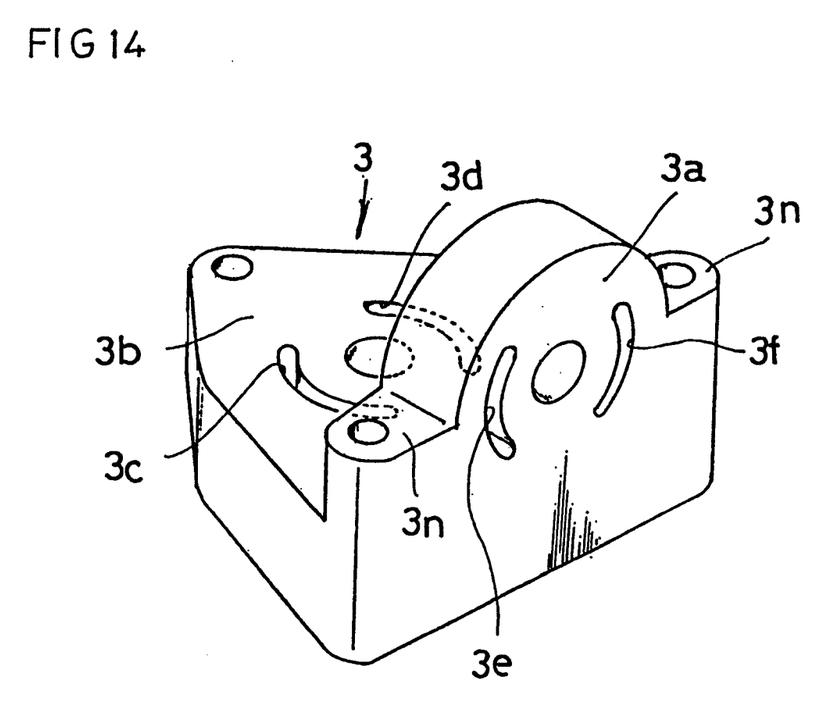
FIG. 14 is a perspective view of the L-like-shaped center section 3 which is so constructed that insertion bores for fixing bolts 14 and 15 are provided at both widthwise sides of the vertical portion of the L-like-shaped center section 3 and the bearing surfaces 3n thereof are made substantially coincident with the plane of fixedly junction surface of axle casing.

In FIG. 14, insertion bores for fixing bolts 14 and 15 for fixing therethrough the L-like-shaped center section 3 onto the mounting surface of the upper axle casing 1 are provided at both widthwise ends of vertical portion of L-like-shaped center section 3 and the bearing surface 3n for the bolts 14 and 15 are formed to be substantially coincident with each other in the plane of fixedly junction surface between the upper and lower axle casings.

Figure 15:
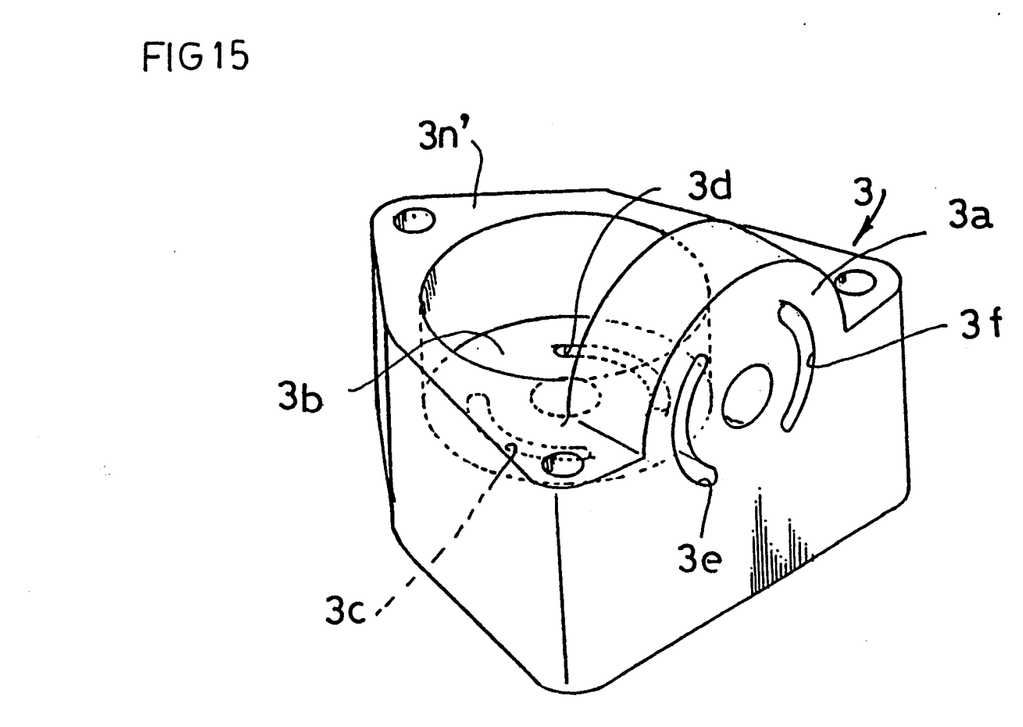
FIG. 15 is a perspective view of the L-like-shaped center section 3 in which the bearing surfaces 3n' for three fixing bolts 13, 14 and 15 are continued to be made substantially coincident with the plane of the fixedly junction surface of the axle casing, and only part of forming a pump mounting surface 3b is recessed downwardly of the fixedly junction surface.

Such construction allows the bearing surfaces 3n to serve also as the reinforcing ribs. In FIG. 15, the bearing surfaces 3n' for the fixing bolts 13, 14 and 15 are continued and substantially level with the axis of motor shaft 12, and only a portion of forming the pump mounting surface 3b is recessed and positioned lower than the axis of motor shaft 12. Such construction also can prevent the vertical portion of L-like-shaped center section 3 from deflecting.

Next, explanation will be given on operation of the axle driving system of the present invention.

Mounting seats 1a, 1b and 1c project at the lower end downwardly from the fixedly junction surface L1 between the upper axle casing 1 and the lower axle casing 2 and form a fixedly junction surface L2 between the lower ends of mounting bases 1a, 1b and 1c and the pump mounting surface 3b of L-like-shaped center section 3. The fixedly junction surface L1 between the upper axle casing 1 and the lower axle casing 2 is positioned higher only by a distance t than that L2 between the mounting bases 1a, 1b and 1c and also higher than the pump mounting surface 3b.

Meanwhile, since the vertical portion of L-like-shaped center section 3 largely upwardly projects, the kidney ports 3f and 3e for the hydraulic motor unit is positioned higher only by a distance t, whereby the motor shaft 12 can be level with the fixedly junction surface L1 between the upper axle casing 1 and the lower axle casing 2.

As seen from the above, the present invention is advantageous in that the pump shaft 11 can be positioned relative-lower than the motor shaft 12 in comparison with the conventional axle driving system. Therefore, the belt transmitting mechanism from the engine to the pulley at the pump shaft 11 can be lowered, whereby the axle driving system for the integral hydraulic transmission matching with the lower floor vehicle can be constituted. Since operating oil can forcibly be charged from the exterior of axle casing into the closed circuit at the center section within the axle casing, the hydraulic transmission can quickly be set in working condition to thereby improve assembly efficiency of axle driving system.

What is claimed is:

1. An axle driving apparatus comprising:
    an axle casing including an upper casing joined to a lower casing forming a first junction surface which lies in a first plane;
    axle disposed within said axle casing;
    a center section disposed within said axle casing, said center section including a substantially horizontal portion and a substantially vertical portion, a pump mounting surface formed on an upper portion of said substantially horizontal portion and lying in a second plane parallel to said first plane and offset therefrom by a distance t, said substantially horizontal portion of said center section forming a second junction surface with said axle casing;
    a hydraulic pump disposed within said axle casing on said pump mounting surface; and
    a hydraulic motor disposed within said axle casing on a motor mounting surface formed on said substantially vertical portion, said motor being drivingly connected to said axle.

2. An axle driving apparatus according to claim 1, wherein said second junction surface is formed between said upper portion of said substantially horizontal portion and a mounting seat disposed within said axle casing.

3. An axle driving apparatus according to claim 2, wherein said mounting seat is molded with said axle casing.

4. An axle driving apparatus according to claim 3, wherein said mounting seat is molded with said upper casing.

5. An axle driving apparatus according to claim 2, wherein said second junction surface lies in said first plane.

6. An axle driving apparatus according to claim 2, wherein said second junction surface lies in said second plane.

7. An axle driving apparatus according to claim 1, further comprising:
    a motor shaft having an axis which is substantially aligned with said first junction surface of said axle casing.

8. An axle driving apparatus according to claim 1, wherein said pump mounting surface of said center section is disposed within said lower casing.

9. An axle driving apparatus according to claim 1, wherein said second junction surface is formed between said center section and said upper casing.

10. An axle driving apparatus according to claim 1, further comprising:
    a mounting seat molded within said upper casing for said center section.

11. An axle driving apparatus according to claim 1, wherein said center section further comprises:
    a first pair of straight oil passages;
    a second pair of straight oil passages;
    a first pair of crescent oil passages open at said pump mounting surface;
    a second pair of crescent oil passages open at said motor mounting surface;
    wherein said first pair of straight oil passages is in fluid communication with said first pair of crescent oil passages and said second pair of straight oil passages is in fluid communication with said second pair of crescent oil passages, and wherein said second pair of straight oil passages is substantially perpendicular to and in fluid communication with an end of said first pair of straight oil passages.

12. An axle driving apparatus according to claim 11, wherein each of said second pair of straight oil passages extends downwardly from said pump mounting surface terminating in an open end closed by a blind plug.

13. An axle driving apparatus according to claim 11, wherein each of said second pair of straight oil passages extends downwardly from said pump mounting surface terminating in an open end closed by a relief valve.

14. An axle driving apparatus according to claim 11, wherein each of said second pair of straight oil passages extends downwardly from said pump mounting surface terminating in an open end closed by a charge port open to the exterior of said axle casing.

15. An axle driving apparatus according to claim 14, further comprising:
    a pipe member disposed within each of said charge ports, an end of said pipe member including a threaded blind plug which projects outwardly from said lower casing.

16. An axle driving apparatus according to claim 14, further comprising:
    a hollow member formed integrally with said center section in fluid communication with each of said charge ports.

17. An axle driving apparatus comprising:
    an axle casing including an upper casing joined to a lower casing forming a first junction surface which lies in a first plane;
    an axle disposed within said axle casing;
    a center section disposed within said axle casing, said center section including a pump mounting surface and a motor mounting surface, said pump mounting surface being perpendicular to said motor mounting surface and lying in a second plane parallel to said first plane and offset therefrom by a distance t, said center section forming a second junction surface with said axle casing;
    a hydraulic pump disposed within said axle casing on said pump mounting surface;
    a hydraulic motor disposed within said axle casing on said motor mounting surface, said motor drivingly connected to said axle; and
    a mounting seat for said center section disposed within said casing which includes an extension having a length which is substantially aligned with said second junction surface.

18. An axle driving apparatus according to claim 17, further including a motor shaft having an axis which is substantially aligned with said first junction surface of said casing.

19. An axle driving apparatus according to claim 17, wherein said second junction surface is formed between said center section and said upper casing.

20. An axle driving apparatus according to claim 17, wherein said pump mounting surface lies within said lower casing.

21. An axle driving apparatus according to claim 17, wherein said mounting seat is molded with said axle casing.

22. An axle driving apparatus according to claim 21, wherein said mounting seat extends into said lower casing.

23. An axle driving apparatus according to claim 21, wherein said mounting seat is molded with said upper casing.

24. An axle driving apparatus according to claim 17, wherein said center section further comprises:
- a first pair of straight oil passages;
- a second pair of straight oil passages;
- a first pair of crescent oil passages open at said pump mounting surface;
- a second pair of crescent oil passages open at said motor mounting surface;
- wherein said first pair of straight oil passages is in fluid communication with said first pair of crescent oil passages and said second pair of straight oil passages is in fluid communication with said second pair of crescent oil passages, and wherein said second pair of straight oil passages is substantially perpendicular to and in fluid communication with an end of said first pair of straight oil passages.

25. An axle driving apparatus according to claim 24, wherein each of said second pair of straight oil passages extends downwardly from said pump mounting surface terminating in an open end closed by a blind plug.

26. An axle driving apparatus according to claim 24, wherein each of said second pair of straight oil passages extends downwardly from said pump mounting surface terminating in an open end closed by a relief valve.

27. An axle driving apparatus according to claim 24, wherein each of said second pair of straight oil passages extends downwardly from said pump mounting surface terminating in an open end closed by a charge port open to the exterior of said axle casing.

28. An axle driving apparatus according to claim 27, further comprising:
- a pipe member disposed within each of said charge ports, an end of said pipe member including a threaded blind plug which projects outwardly from said lower casing.

29. An axle driving apparatus according to claim 27, further comprising:
- a hollow member formed integrally with said center section in fluid communication with each of said charge ports.

30. An axle driving apparatus according to claim 17, wherein said distance t is substantially equal to the length of said extension.

31. An axle driving apparatus according to claim 30, wherein said second junction surface lies in said first plane.

32. An axle driving apparatus according to claim 30, wherein said second junction surface lies in said second plane.

33. An axle driving apparatus comprising:
- an axle casing including an upper casing joined to a lower casing forming a first junction surface which lies in a first plane;
- an axle disposed within said axle casing;
- a center section disposed within said axle casing, said center section including a pump mounting surface and a motor mounting surface, said pump mounting surface perpendicular to said motor mounting surface and lying in a second plane parallel to said first plane and offset therefrom by a distance t;
- a mounting seat for said center section disposed within said axle casing which includes a portion which forms a second junction surface with said center section;
- a hydraulic pump disposed within said axle casing on said pump mounting surface; and
- a hydraulic motor disposed within said axle casing on said motor mounting surface, said hydraulic motor drivingly connected to said axle.

34. An axle driving apparatus according to claim 33, further including a motor shaft having an axis which is substantially aligned with said first junction surface of said casing.

35. An axle driving apparatus according to claim 33, wherein said mounting seat is molded within said axle easing.

36. An axle driving apparatus according to claim 33, wherein said center section further comprises:
- a first pair of straight oil passages;
- a second pair of straight oil passages;
- a first pair of crescent oil passages open at said pump mounting surface;
- a second pair of crescent oil passages open at said motor mounting surface;
- wherein said first pair of straight oil passages is in fluid communication with said first pair of crescent oil passages and said second pair of straight oil passages is in fluid communication with said second pair of crescent oil passages, and wherein said second pair of straight oil passages is substantially perpendicular to and in fluid communication with an end of said first pair of straight oil passages.

37. An axle driving apparatus according to claim 36, wherein each of said second pair of straight oil passages extends downwardly from said pump mounting surface terminating in an open end closed by a blind plug.

38. An axle driving apparatus according to claim 36, wherein each of said second pair of straight oil passages extends downwardly from said pump mounting surface terminating in an open end closed by a relief valve.

39. An axle driving apparatus according to claim 36, wherein each of said second pair of straight oil passages extends downwardly from said pump mounting surface terminating in an open end closed by a charge port open to the exterior of said axle casing.

40. An axle driving apparatus according to claim 39, further comprising:
- a pipe member disposed within each of said charge ports, an end of said pipe member including a threaded blind plug which projects outwardly from said lower casing.

41. An axle driving apparatus according to claim 39, further comprising:
- a hollow member formed integrally with said center section in fluid communication with each of said charge ports.

42. An axle driving apparatus according to claim 33, wherein said second junction surface is formed between said center section and said upper axle casing.

43. An axle driving apparatus according to claim 33, wherein said mounting surface extends from said upper casing into said lower casing.

* * * * *